United States Patent
Read

(10) Patent No.: US 12,540,102 B2
(45) Date of Patent: Feb. 3, 2026

(54) 3D WOVEN SPACE FILLER

(71) Applicant: Raytheon Technologies Corporation, Farmington, CT (US)

(72) Inventor: Kathryn S. Read, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 1238 days.

(21) Appl. No.: 17/556,416

(22) Filed: Dec. 20, 2021

(65) Prior Publication Data

US 2023/0145812 A1    May 11, 2023

Related U.S. Application Data

(60) Provisional application No. 63/276,040, filed on Nov. 5, 2021.

(51) Int. Cl.
    *C04B 35/80* (2006.01)
    *C04B 35/628* (2006.01)

(52) U.S. Cl.
    CPC ........ *C04B 35/80* (2013.01); *C04B 35/62844* (2013.01); *C04B 2235/5244* (2013.01); *C04B 2235/5256* (2013.01); *C04B 2235/6028* (2013.01)

(58) Field of Classification Search
    CPC .......... F01D 5/147; F01D 5/282; F01D 5/284; F01D 5/3084
See application file for complete search history.

(56) References Cited

U.S. PATENT DOCUMENTS

| | | | |
|---|---|---|---|
| 5,049,329 | A | 9/1991 | Allaire et al. |
| 5,459,114 | A | 10/1995 | Kaya et al. |
| 5,547,622 | A | 8/1996 | Chalasani et al. |
| 5,732,748 | A | 3/1998 | Aucagne et al. |
| 5,756,206 | A | 5/1998 | Davies et al. |
| 6,585,842 | B1 | 7/2003 | Bompard et al. |
| 6,641,893 | B1 | 11/2003 | Suresh et al. |
| 7,837,914 | B2 | 11/2010 | Kostar et al. |
| 8,440,045 | B2 | 5/2013 | Bremmer et al. |
| 8,545,938 | B2 | 10/2013 | Schmidt et al. |

(Continued)

FOREIGN PATENT DOCUMENTS

| | | | |
|---|---|---|---|
| CN | 102448910 A | | 5/2012 |
| CN | 111058187 A | | 4/2020 |

(Continued)

OTHER PUBLICATIONS

International Preliminary Report on Patentability for PCT Application No. PCT/US2022/053178, Dated Jun. 20, 2024, pp. 5.

(Continued)

*Primary Examiner* — Brian O Peters
(74) *Attorney, Agent, or Firm* — Kinney & Lange, P.A.

(57) ABSTRACT

A ceramic fiber preform includes a plurality of ceramic fiber plies arranged to define a wall, a void adjacent the wall, and an insert positioned within the void. The insert includes a first region having a first porosity and a second region in physical contact with the first region and having a second porosity. The first region and second region are formed from a woven ceramic material, the wall has a wall porosity, and the first porosity is less than at least one of the second porosity and the wall porosity.

16 Claims, 3 Drawing Sheets

(56) References Cited

U.S. PATENT DOCUMENTS

| | | | |
|---|---|---|---|
| 9,908,305 | B2 | 3/2018 | Chamberlain et al. |
| 10,822,281 | B2 | 11/2020 | She et al. |
| 10,829,418 | B2 | 11/2020 | Jackson et al. |
| 10,954,169 | B2 | 3/2021 | Droz et al. |
| 11,015,467 | B2 | 5/2021 | Read |
| 11,072,565 | B2 | 7/2021 | Weaver et al. |
| 2002/0022422 | A1 | 2/2002 | Waldrop et al. |
| 2002/0084558 | A1 | 7/2002 | Hanzawa et al. |
| 2005/0164578 | A1 | 7/2005 | Aldridge et al. |
| 2007/0096371 | A1 | 5/2007 | McGuigan et al. |
| 2007/0099527 | A1 | 5/2007 | Brun et al. |
| 2010/0119777 | A1 | 5/2010 | Merrill et al. |
| 2012/0074265 | A1* | 3/2012 | Hallander ......... B29C 66/72141 524/548 |
| 2012/0237707 | A1 | 9/2012 | Beraud et al. |
| 2012/0301691 | A1 | 11/2012 | Charleux et al. |
| 2014/0099484 | A1 | 4/2014 | Roberts et al. |
| 2016/0136925 | A1 | 5/2016 | Chamberlain et al. |
| 2016/0186691 | A1 | 6/2016 | Charleux et al. |
| 2017/0015595 | A1 | 1/2017 | Weaver et al. |
| 2017/0348876 | A1 | 12/2017 | Lin et al. |
| 2018/0281228 | A1 | 10/2018 | Godon et al. |
| 2019/0048730 | A1 | 2/2019 | Subramanian et al. |
| 2019/0359531 | A1 | 11/2019 | Steffier et al. |
| 2019/0389171 | A1 | 12/2019 | Nelson |
| 2020/0078822 | A1 | 3/2020 | Khattab et al. |
| 2020/0385898 | A1 | 12/2020 | Chiu et al. |
| 2021/0239008 | A1 | 8/2021 | Read |
| 2021/0262353 | A1 | 8/2021 | Mccaffrey et al. |
| 2023/0191656 | A1 | 6/2023 | Read et al. |

FOREIGN PATENT DOCUMENTS

| | | | | |
|---|---|---|---|---|
| DE | 102015209535 | A1 | 11/2016 | |
| EP | 0302449 | A2 | 2/1989 | |
| EP | 0589286 | A1 | 3/1994 | |
| EP | 1215183 | A1 | 6/2002 | |
| EP | 3590906 | A1 * | 1/2020 | ............ B28B 1/001 |
| EP | 3650424 | A1 | 5/2020 | |
| EP | 4119709 | A1 | 1/2023 | |
| GB | 2252315 | A | 8/1992 | |
| JP | 2000096387 | A | 4/2000 | |
| JP | 2005290204 | A | 10/2005 | |
| JP | 2007332484 | A | 12/2007 | |
| WO | 9412708 | A1 | 6/1994 | |
| WO | 2010061139 | A2 | 6/2010 | |
| WO | 2021005282 | A2 | 1/2021 | |

OTHER PUBLICATIONS

International Search Report and Written Opinion for PCT Application No. PCT/US2022/053178, Dated May 2, 2023, pp. 9.

Extended European Search Report for EP Application No. 22212549.4, Dated Jun. 7, 2023, pp. 13.

Partial European Search Report for EP Application No. 22212614.6, Dated Jun. 30, 2023, pp. 14.

L. Borkowski, et al., "Multiscale model of woven ceramic matrix composites considering manufacturing induced damage," from Composite Structures 126, (2015), pp. 62-71.

MS Chang's Art Classes, Ceramic Bowl, Nov. 12, 2014, 4 pages, from <http://www.mschangart.com/studio-art-honors/ceramic-bowl (Year: 2014)>.

First Communication Pursuant to Article 94(3) EPC for EP Application No. 22205639.2, Dated Jan. 10, 2025, pp. 3.

First Communication Pursuant to Article 94(3) EPC for EP Application No. 22212559.3, Dated Jan. 10, 2025, pp. 6.

Extended European Search Report for EP Application No. 22212559.3, May 10, 2023, pp. 8.

Extended European Search Report for EP Application No. 22205639.2, dated Mar. 24, 2023, 7 pages.

* cited by examiner

3D WOVEN SPACE FILLER

CROSS-REFERENCE TO RELATED APPLICATION(S)

This application claims the benefit of U.S. Provisional Application No. 63/276,040 filed Nov. 5, 2021 for "3D WOVEN SPACE FILLER" by K. Read.

BACKGROUND

The present invention relates to ceramic matrix composites and, more particularly, space filling inserts for use in ceramic matrix composite preforms.

Many ceramic matrix composite (CMC) components for gas turbine engines have regions of variable wall thickness. Some of these regions are too small to form with standard ply(s) of woven cloth but too large to form using individual fiber tows. In such cases, space filling inserts can be used to build upon and prevent large voids in the body of the CMC. As with other locally-thickened regions of CMCs, these inserts can often present challenges in achieving a high and/or uniform density through the chemical vapor infiltration (CVI) process.

SUMMARY

A ceramic fiber preform includes a plurality of ceramic fiber plies arranged to define a wall, a void adjacent the wall, and an insert positioned within the void. The insert includes a first region having a first porosity and a second region in physical contact with the first region and having a second porosity. The first region and second region are formed from a woven ceramic material, the wall has a wall porosity, and the first porosity is less than at least one of the second porosity and the wall porosity.

A ceramic fiber preforms includes a woven ceramic insert having a first porosity and a plurality of ceramic fiber plies surrounding the insert to form an outer layer. The outer layer has a second porosity greater than the first porosity.

An insert for inclusion in a void of a ceramic fiber preform includes a first region having a first porosity and a second region in physical contact with the first region and having a second porosity. The first region and the second region are formed from a woven ceramic material, and the first porosity is different from the second porosity.

Figure 1:
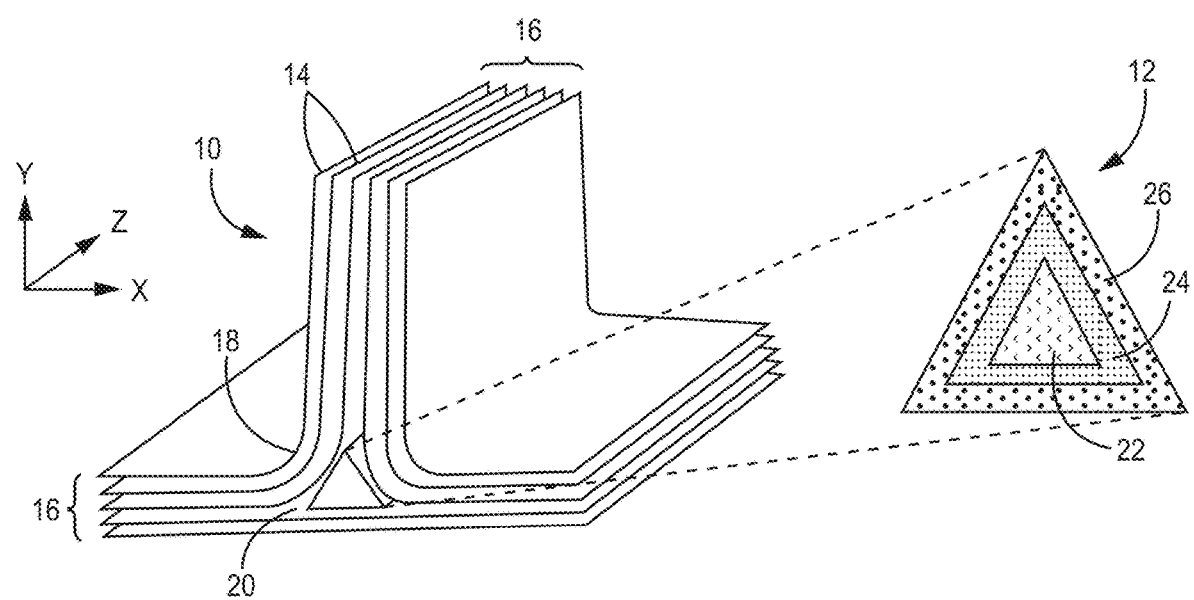
FIG. 1 is a simplified perspective view of a preform structure with a triangular insert shown in close-up.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents various space filling inserts, sometimes referred to as "noodles," for incorporation into a CMC preform. The inserts can be formed using a three-dimensional (3D) weaving technique to create a structure with a gradient porosity through its thickness. More specifically, two or more regions of differing porosity can be incorporated into an insert depending on factors such as its thickness and shape. The gradient arrangement enables a more even matrix infiltration of the insert and encompassing preform structure.

FIG. 1 is a simplified perspective view of preform 10 with an enlarged view of insert 12. Preform 10 can be used to form a CMC component for use in a gas turbine engine combustor, compressor, and/or turbine section, to name a few non-limiting examples. Preform 10 is formed from multiple plies 14 laid up in such a manner as to form a structure with a desired shape and thickness. Plies 14 can be formed from braided, woven, and/or chopped ceramic fibers or tows. The ceramic material can be silicon carbide or another suitable ceramic material. As shown in FIG. 1, plies 14 can be laid up to form walls 16 with curved regions 18. The bending of plies 14 to form curved region 18 can create a void 20 between a subset of plies 14. Void 20 can be too small to effectively fill with additional plies 14, and too large to fill with individual ceramic tows or tow bundles. Thus, insert 12 can be formed to have a shape and size generally complementary to void 20. More specifically, insert 12 can be formed to have a complementary triangular cross-sectional geometry, a thickness or width defined in one or a combination of the x and y-axes, and a length extending alone the z-axis. Generally speaking, insert 12 is sized to fill void 20 along the x, y, and z-axes.

Insert 12 can be formed from woven ceramic fibers, as is discussed in greater detail below. As can be seen in the enlarged view, insert 12 includes regions 22, 24, and 26 in the concentrically innermost to outermost direction. Insert 12 can include just two or four regions in an alternative embodiment. Each region is associated with a different material porosity. In an exemplary embodiment, innermost (first) region 22 has a first porosity, middle (second) region 24 has a second porosity, and outermost (third) region 26 has a third porosity. The porosity gradient of insert 12 is such that first porosity<second porosity<third porosity. Material porosity can be a function of the fiber volume fraction of the woven ceramic material in each region 22, 24, and 26. Each of these regions can be formed to have a fiber volume fraction (i.e., the fraction of fiber volume to total volume of the insert) and a void/pore fraction (i.e., the fraction of void/pore volume to total volume of the insert) that differs from the other regions. In a preform (e.g., preform 10), fiber volume fraction and pore volume fraction are generally inversely proportional such that a region with low porosity will have a high fiber volume fraction relative to the other regions. In the embodiment shown, the fiber volume fraction of region 22 (first fiber volume fraction)>the fiber volume fraction of region 24 (second fiber volume fraction)>the fiber volume fraction of region 26 (third fiber volume fraction). In general, the fiber volume fraction of each region will differ from the immediately adjacent region by at least 1%. More specifically, region 22 can have a fiber volume fraction ranging from 40% to 45%, region 24 can have a fiber volume fraction ranging from 35% to 40%, and region 26 can have a fiber volume fraction ranging from 30% to 35%. Walls 16 abutting void 20/insert 12 can also have a wall porosity and fiber volume fraction different from most or all of sections 22, 24, 26. In the embodiment shown, walls 16 can have a porosity and fiber volume fraction generally equal to or slightly less than immediately adjacent region 26. More specifically, the fiber volume fraction of walls 16 can range from 32% to 40%.

Insert 12 can be formed by 3D (i.e., Jacquard) weaving, having fiber components in three, generally orthogonal (x, y, z) axes. As with two-dimensional (2D) woven structures (e.g., plies 14), insert 12 can have warp and weft fibers (tows), but can further include z-fibers orthogonal to and crossing over layers of warp and/or weft fibers. The various fibers can be formed from the same ceramic (e.g., silicon carbide) material, or from combinations of different ceramics. In an alternative embodiment, polymer fibers or yarns can be included at some positions on the loom and incorporated into the insert. In such an embodiment, the polymer fibers can be decomposed (e.g., thermally or chemically) during subsequent processing to help locally control the fiber volume fraction/porosity of the insert, as these fugitive polymer fibers leave behind open spaces when decomposed. Certain embodiments can be formed such that each section 22, 24, 26 is separately woven from and joined with the other sections. More specifically, first section 22 can be woven, then second section 24 can be woven around first section 22, then third section 26 can be woven around section 24. In order to achieve the porosity gradient across sections 22, 24, and 26, material characteristics such as fiber length, shape, and/or cross-sectional area can be varied to achieve different fiber volume fractions. It is alternatively and/or additionally possible to modify the weaving technique/pattern from section to section to vary fiber spacing and number of interlacements between yarns. For example, increased fiber spacing can lead to a decrease in fiber volume fraction, and a greater number of interlacements can lead to an increase in fiber volume fraction.

Figure 2:
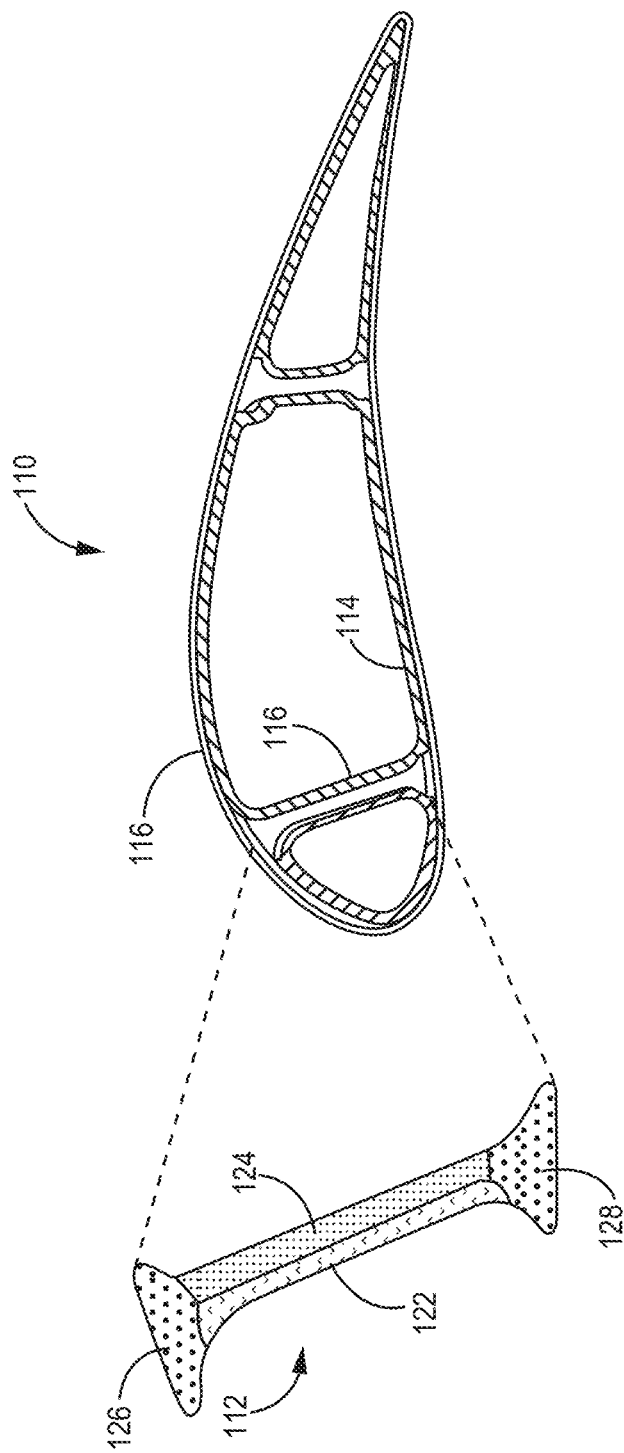
FIG. 2 is simplified cross-sectional view of an airfoil preform with an I-shaped insert shown in close-up.

FIG. 2 is a simplified cross-sectional view of airfoil preform 110 with an enlarged view of insert 112. Like preform 10, preform 110 is formed from various plies 114, which can be substantially similar to plies 14. Insert 112 has an I-shaped cross-sectional geometry and is incorporated into an airfoil structural rib spanning between outer walls 116 formed by plies 114. Although not visible in FIG. 2, insert 112 occupies a complementary void between rib walls 116 also formed by plies 114.

Instead of multiple concentric regions, insert 112 has abutting regions 122, 124, 126, and 128. In the embodiment shown, the porosity gradient is such that first region 122<second region 124<third region 126=fourth region 128. That is, the distal ends (regions 126 and 128) of insert 112 can have equal porosities. In an alternative embodiment, all four regions 122, 124, 126, 128 can have different porosities. In another alternative embodiment, insert 112 can have only three regions, for example, with one on each end and one larger section (e.g., a combination of regions 122 and 124) disposed between the two ends. Other arrangements are contemplated herein. The fiber volume fraction of each region can be substantially similar to the ranges discussed above with respect to insert 12. That is, the fiber volume fraction of region 122 can range from 40% to 45%, region 124 can have a fiber volume fraction ranging from 35% to 40%, and regions 126 and 128 can each have a fiber volume fraction ranging from 30% to 35%. Walls 116 can have a fiber volume fraction ranging from 32% to 40%. Like insert 12, insert 112 can be formed by 3D weaving. Each section can be individually woven and joined together using, for example, using a stitching technique to secure each section to the abutting section, or various adhesives can be used.

Referring now to both FIGS. 1 and 2, preforms 10 and 110 can undergo matrix formation and densification using a CVI process in which plies 14, 114 and inserts 12, 112 are infiltrated by reactant vapors, and a gaseous precursor deposits on the ceramic fibers. The matrix material can be a silicon carbide or other suitable ceramic material. Densification is carried out until the resulting CMC has reached the desired residual porosity. The gradient arrangement of inserts 12, 112 with respect to the abutting walls 16, 116 allows for a more even distribution of matrix precursor material within preforms 10, 110. This occurs because sufficient amounts of precursor can reach the inner (i.e., less porous) regions before the walls or outer regions seal off/become too densely packed with precursor due to their relatively greater porosity. With respect to inserts 12, 112, the regions can be arranged in any desired manner based on the expected direction of flow of the gaseous precursor in the reactor, for example, with regions more exposed to the gaseous precursor being more porous than those shielded by other preform structures. The porosity/fiber volume fraction gradient of insert 12, for example, can produce a uniform density to the final workpiece (i.e., post-densification) by facilitating infiltration through higher porosity regions and providing higher fiber volume fraction in regions more difficult to infiltrate. More generally, the porosity gradient of any insert (e.g., 112) can be selected to produce desired densities in different portions of the completed workpiece by providing locally increased preform density or locally enhanced infiltration via increased porosity.

Figure 3:
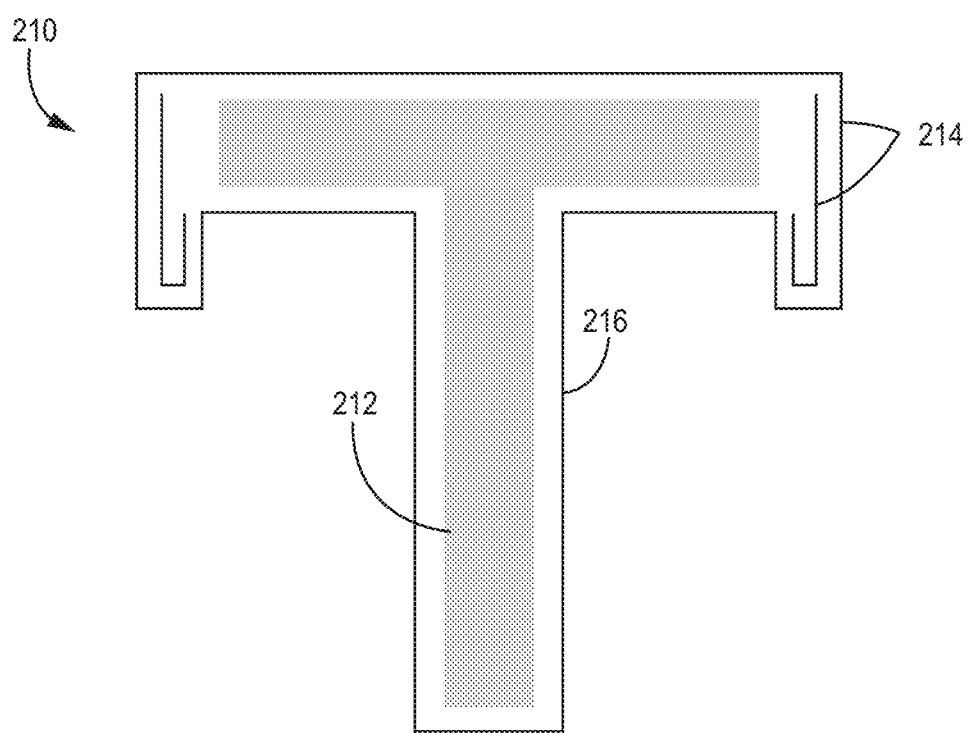
FIG. 3 is a simplified cross-sectional view of a preform structure with a T-shaped core insert.

FIG. 3 is simplified cross-sectional view of preform 210 having T-shaped core insert 212 surrounded by plies 214. Instead of being inserted into a void created by the lay-up of plies 214, core insert 212 can serve as a scaffolding on which to lay up plies 214. Core insert 212 can further make up the majority (greater than 50%) of the total volume of preform 210. Plies 214 form a wall or outer layer 216 surrounding core insert 212. Plies 214 are substantially similar in composition to plies 14 and 114. Core insert 212 is similar to inserts 12 and 112 in composition and method of formation. However, core insert 212 can have a generally uniform porosity while a porosity gradient is created across preform 210 by making core insert 212 less porous (having a higher fiber volume fraction) than surrounding outer layer 216. In an alternative embodiment, core insert 212 can be formed to have regions of varying porosity. Preform 210 can undergo matrix formation in the same manner as preforms 10 and 110 such that a porosity gradient permits more even matrix distribution.

It should be understood that various other insert shapes, such as rectangular, circular, elliptical, "U," and "V" can alternatively and/or additionally be formed for incorporation into the disclosed preforms without departing from the scope of the invention. A CMC component formed with the disclosed inserts can be incorporated into aerospace, maritime, or industrial equipment, to name a few, non-limiting examples.

DISCUSSION OF POSSIBLE EMBODIMENTS

The following are non-exclusive descriptions of possible embodiments of the present invention.

A ceramic fiber preform includes a plurality of ceramic fiber plies arranged to define a wall, a void adjacent the wall, and an insert positioned within the void. The insert includes a first region having a first porosity and a second region in physical contact with the first region and having a second porosity. The first region and second region are formed from a woven ceramic material, the wall has a wall porosity, and the first porosity is less than at least one of the second porosity and the wall porosity.

The preform of the preceding paragraph can optionally include, additionally and/or alternatively, any one or more of the following features, configurations and/or additional components:

In the above preform, the ceramic fiber plies and the woven ceramic material can be formed from silicon carbide.

In any of the above preforms, the insert can further include a third region in physical contact with at least one of the first or second region and having a third porosity.

In any of the above preforms, the first porosity can be less than the second porosity, and the second porosity can be less than the third porosity and the wall porosity.

In any of the above preforms, the first region can have a first fiber volume fraction, the second region can have a second fiber volume fraction, the third region can have a third fiber volume fraction, and the wall can have a wall fiber volume fraction.

In any of the above preforms, the first fiber volume fraction can be greater than the second fiber volume fraction, and the second fiber volume fraction can be greater than the third fiber volume fraction and the wall fiber volume fraction.

In any of the above preforms, the insert can have a one of a triangular cross-sectional shape and an "I" cross-sectional shape.

A gas turbine engine component can include any of the above preforms and a ceramic matrix deposited onto and within the preform.

A ceramic fiber preforms includes a woven ceramic insert having a first porosity and a plurality of ceramic fiber plies surrounding the insert to form an outer layer. The outer layer has a second porosity greater than the first porosity.

In the above preform, the insert can have a "T" cross-sectional shape.

In any of the above preforms, the insert can be 50% or more of the total volume of the preform.

An insert for inclusion in a void of a ceramic fiber preform includes a first region having a first porosity and a second region in physical contact with the first region and having a second porosity. The first region and the second region are formed from a woven ceramic material, and the first porosity is different from the second porosity.

In the above insert, the woven ceramic material can include tows of silicon carbide.

Any of the above inserts can further include woven polymer fibers.

Any of the above inserts can further include a third region in physical contact with at least one of the first or second region and having a third porosity, and the third region can be formed from the woven ceramic material.

In any of the above inserts, the first region can be positioned concentrically within the second region, the second region can be positioned concentrically within the third region, the first porosity can be less than the second porosity, and the second porosity can be less than the third porosity.

In any of the above inserts, the first region can have a first fiber volume fraction, the second region can have a second fiber volume fraction less than the first fiber volume fraction, and the third region can have a third fiber volume fraction less than the second fiber volume fraction.

Any of the above inserts can have a triangular cross-sectional shape.

Any of the above inserts can further include a fourth region in physical contact with at least one of the first, second, or third regions and having a fourth porosity. The fourth region can be formed from the woven ceramic material, and the fourth porosity can be greater than at least one of the first porosity, the second porosity, and the third porosity.

Any of the above inserts can have a "I" cross-sectional shape.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ceramic fiber preform comprising:
a plurality of ceramic fiber plies arranged to define a wall;
a void adjacent the wall; and
an insert positioned within the void, the insert comprising:
a first region having a first porosity;
a second region in physical contact with the first region and having a second porosity; and
a third region in physical contact with at least one of the first region or the second region and having a third porosity;
wherein the first region, the second region, and the third region are formed from a woven ceramic material;
wherein the wall has a wall porosity;
wherein the first region is positioned concentrically within the second region, and the second region is positioned concentrically within the third region; and
wherein the first porosity is less than at least one of the second porosity and the wall porosity.

2. The preform of claim 1, wherein the ceramic fiber plies and the woven ceramic material are formed from silicon carbide.

3. The preform of claim 1, wherein the first porosity is less than the second porosity, and wherein the second porosity is less than the third porosity and the wall porosity.

4. The insert of claim 3, wherein the first region has a first fiber volume fraction, the second region has a second fiber volume fraction, the third region has a third fiber volume fraction, and the wall has a wall fiber volume fraction.

5. The insert of claim 4, wherein the first fiber volume fraction is greater than the second fiber volume fraction, and wherein the second fiber volume fraction is greater than the third fiber volume fraction and the wall fiber volume fraction.

6. The insert of claim 1, wherein the insert has a one of a triangular cross-sectional shape and an "I" cross-sectional shape.

7. A gas turbine engine component comprising:
the preform of claim 1; and
a ceramic matrix deposited onto and within the preform.

8. An insert for inclusion in a void of a ceramic fiber preform, the insert comprising:
a first region having a first porosity; and
a second region in physical contact with the first region and having a second porosity;

a third region in physical contact with at least one of the first or second region and having a third porosity, wherein:
the first region is positioned concentrically within the second region,
the second region is positioned concentrically within the third region,
the first porosity less than the second porosity,
the second porosity is less than the third porosity,
the first region has a first fiber volume fraction,
the second region has a second fiber volume fraction less than the first fiber volume fraction, and
the third region has a third fiber volume fraction less than the second fiber volume fraction.

9. The insert of claim 8, wherein the woven ceramic material comprises tows of silicon carbide.

10. The insert of claim 9, wherein the insert further comprises woven polymer fibers.

11. The insert of claim 8, wherein the insert has a triangular cross-sectional shape.

12. The insert of claim 8, and further comprising:
a fourth region in physical contact with at least one of the first, second, or third regions and having a fourth porosity;
wherein the fourth region is formed from the woven ceramic material; and
wherein the fourth porosity is greater than at least one of the first porosity, the second porosity, and the third porosity.

13. The insert of claim 12, wherein the insert has an "I" cross-sectional shape.

14. A ceramic fiber preform comprising:
a plurality of ceramic fiber plies arranged to define a wall;
a void adjacent the wall having a wall porosity; and
an insert positioned within the void, the insert comprising:
a first region having a first porosity;
a second region in physical contact with the first region and having a second porosity; and
a third region in physical contact with at least one of the first or second region and having a third porosity;
wherein the first region, second region, and the third region are formed from a woven ceramic material;
wherein the first region is positioned concentrically within the second region, and
the second region is positioned concentrically within the third region; and
wherein the first porosity is less the second porosity, and the second porosity is less than the third porosity and the wall porosity.

15. The ceramic fiber preform of claim 14, wherein:
the first region has a first fiber volume fraction,
the second region has a second fiber volume fraction less than the first fiber volume fraction, and
the third region has a third fiber volume fraction less than the second fiber volume fraction.

16. A gas turbine engine component comprising:
the preform of claim 14; and
a ceramic matrix deposited onto and within the preform.

* * * * *